United States Patent
Baardsen

[11] 3,881,084
[45] Apr. 29, 1975

[54] METHOD OF WELDING GALVANIZED STEEL

[75] Inventor: Edward Lund Baardsen, Ann Arbor, Mich.

[73] Assignee: Ford Motor Company, Dearborn, Mich.

[22] Filed: Oct. 4, 1973

[21] Appl. No.: 403,590

[52] U.S. Cl. ............ 219/121 LM; 29/458; 219/137
[51] Int. Cl. ............................................ B23k 27/00
[58] Field of Search... 219/121 L, 121 LM, 121 EB, 219/121 EM, 137, 118; 29/458

[56] References Cited
UNITED STATES PATENTS

| | | | |
|---|---|---|---|
| 3,649,806 | 3/1972 | Konig | 219/121 L |
| 3,679,862 | 7/1972 | Stoll et al. | 219/121 LM |

OTHER PUBLICATIONS
Edward V. Locke et al., "Deep Penetration Welding With High-Power $CO_2$ Lasers," IEEE Journal of Quantum Electronics, Vol. QE-8, No. 2, 2/1972.

Primary Examiner—J. V. Truhe
Assistant Examiner—Clifford C. Shaw
Attorney, Agent, or Firm—Joseph W. Malleck; Keith L. Zerschling

[57] ABSTRACT

A method of welding galvanized steel with a high energy density beam is disclosed. The high energy density can be created by an electron or laser beam with a power density of at least $4 \times 10^6$ watts per square inch. A flux material, such as iron oxide, is disposed adjacent the welding zone, preferably by painting thereon, which is effective to from a compound with the zinc of the galvanized steel upon heating. The compound has a vapor pressure substantially the same or lower than the vapor pressure of the steel substrate so that disruption of the weld puddle is prevented to insure that all of the weld puddle will be available to properly close the weld void.

15 Claims, 4 Drawing Figures

Laser burn-through weld (200 in./min, 5KW) galvanized steel to rimmed steel with no FeO at interface, 275X Laser burn-through weld (200 in/min, 5KW) galvanized steel to rimmed steel with FeO coating at interface, 50X

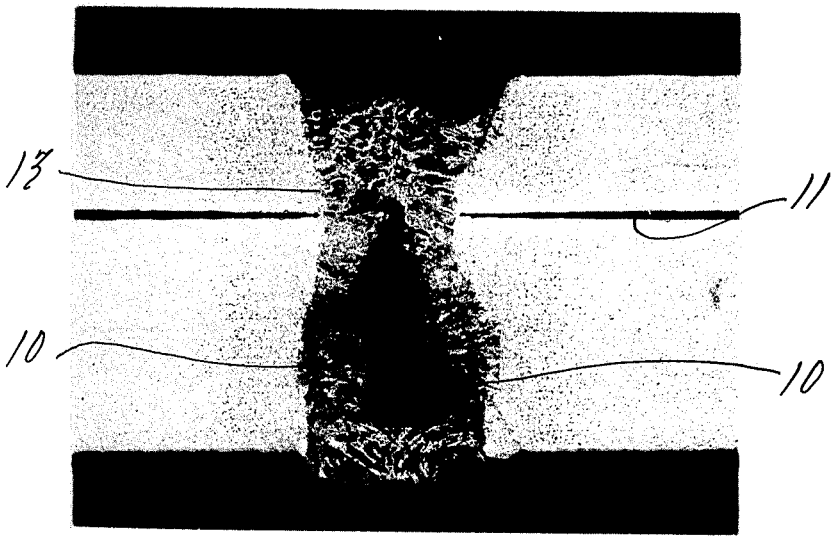
Laser burn-through weld, galvanized steel to galvanized steel, no flux coating at interface, 30X
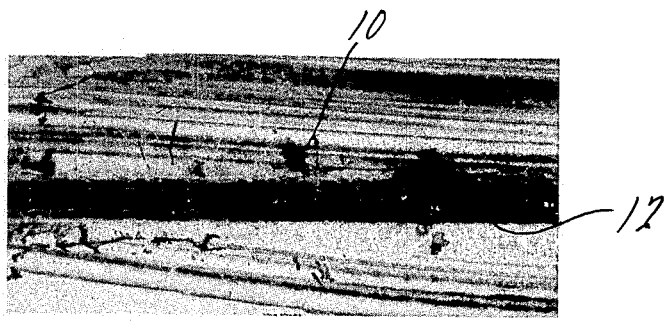
Macrograph of a burn-through weld in galvanized steel. The very dark areas are surface porosity. 30X

METHOD OF WELDING GALVANIZED STEEL

BACKGROUND OF THE INVENTION

When welding galvanized steel with a high energy density beam such as provided by a laser or electron beam, poor weld quality results from splatter and porosity in the weld zone. High energy density beams for welding have become of some importance because of the speed with which welding can be conducted. The high speed is attained by the unique welding process commonly called deep penetration welding associated with a high energy density beam. In this process the energy beam vaporizes a void into the material, the molten material surrounding the void being held apart by the vapor pressure in the void. Accordingly, if at least one steel piece to be welded has a coating of zinc, which has a boiling point lower than the melting point of steel, there will be a sudden drastic vaporization when the focused beam impinges on the zinc coating. If the zinc coating is disposed at the interface between pieces of the workpiece, the drastic vaporization occurs when the void, created by the beam melting process, penetrates to the zinc coating and exposes the zinc coating to the focused beam. This disrupts the stability of the surrounding molten metal about the void resulting in weld splatter and porosity; as a result there will be an insufficient weld puddle to fill the void upon removal of the beam.

Some satisfactory means must be provided to protect or prevent the coating material, such as zinc, from undergoing rapid vaporization and disrupting the stability of the weld puddle so that the void will fill properly. The problem does not present itself in connection with other types of welding such as resistance or other welding with these latter welding types, the heat from the welding mechanism can be conducted to the coating layer slow enough to preclude the sudden vaporization that can occur when a high energy density beam is employed.

One prior art approach to solve this problem has included alloying a substance with the zinc coating to change the vapor pressure, but this has not been successful since discontinuities still appear within the weld zone.

SUMMARY OF THE INVENTION

Accordingly, a primary object of this invention is to provide an improved method for welding galvanized steel based articles by use of a high energy density beam, the method employing substances which will prevent the zinc coating from undergoing rapid vaporization during the welding operation causing deterioration of the weld.

A more particular object of the invention is to prevent the zinc coating from boiling at a much lower temperature than the base steel and to prevent the high vapor pressure of the boiling zinc from providing a driving force to eject the molten steel thereby reducing the weld puddle which is needed to fill the welding void and thereby yielding unacceptable welds.

A feature of this invention pursuant to the latter object is the provision of a thin chemical film adjacent to the trapped zinc is capable of forming a compound with zinc upon heating, the compound having a boiling and melting point substantially the same or higher than that of the steel substrate and having a vapor pressure substantially the same or less than the steel substrate.

Other features pursuant to this invention comprise (a) regulation of the angle of incidence of the concentrated high energy beam, (b) regulation of the deposition of the flux material so as to promote the formation of said compound uniformly throughout the welding zones, and (c) the use of an energy beam with a power density of at least $4 \times 10^6$ watts per square inch.

SUMMARY OF THE DRAWINGS

FIG. 3 is a photomicrograph ($30x$) representing a defective weld without the use of flux material, one sheet of galvanized steel being welded to another sheet of galvanized steel; and FIG. 4 is a macrophotograph ($30x$) of a burnthrough weld between galvanized steel sheet.

DETAILED DESCRIPTION

A high energy density beam, such as a laser or electron beam, has been used with some success in continuous welding of carbon steel in thicknesses varying from 0.030 to 0.075 inches. However, considerable problems are encountered when continuous welding of galvanized sheet steel is attempted with such high energy density beams. Poor welds characterized by internal porosity and inadequate penetration or fusion, are a common result. Poor weld quality principally results from splatter which removes weld metal needed to form a solid closed weld. It has been determined that the coatings, such as zinc in galvanized steel, boil at a much lower temperature than the base steel. The high vapor pressure of the boiling coating provides a driving force to eject molten steel during welding, thereby destroying the continuity of the weld puddle to yield an unacceptable weld.

The mechanics of continuous high density beam welding should be visualized for a complete understanding of the problem. Typically, a cylindrical beam of laser light is generated by a laser amplifier and directed against a focusing mirror; the mirror may converge and turn the beam through an angle for impingement at a desired spot on a workpiece; the workpiece may typically be comprised of superimposed sheets of galvanized steel and the weld configuration may be of the burn-through type. The temperature of the material at the beam focus is above 3,000°F which virtually melts a hole in the workpiece equivalent to boring. A resultant cylinder of molten metal will surround the hole and it is this molten material which is used to uniformly close the void as the beam focus leaves the void to continue along a path to carve a narrow slot or groove.

Figure 2:
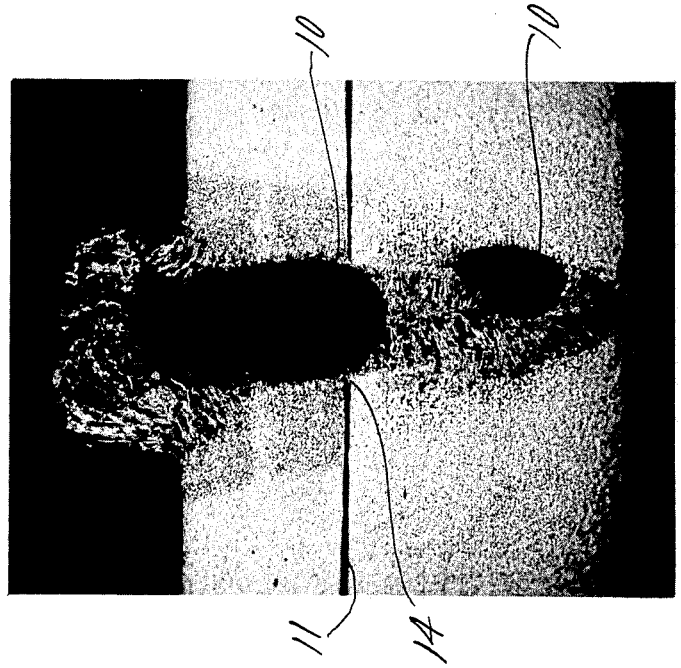
FIGS. 1 and 2 are photomicrographs ($50x$) magnification of a completed weld of a galvanized steel to rimmed steel, one having an FeO coating between the steels and the other not.
Figure 1:
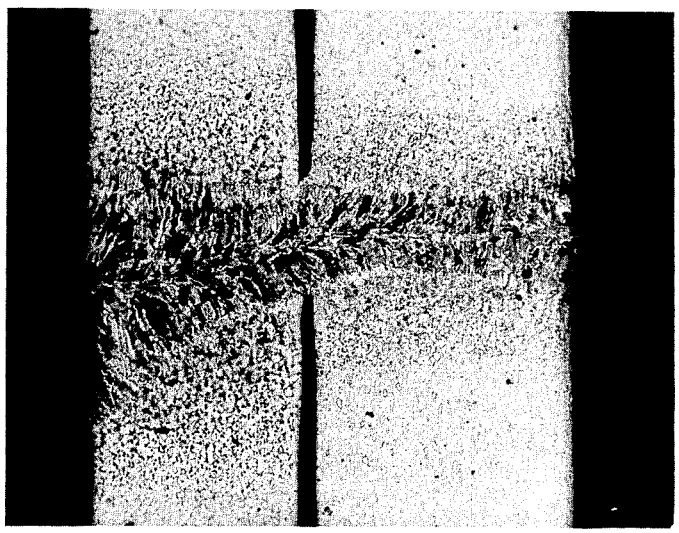

The micro slot (when full penetration through the workpiece is desired) or groove (when penetration through the interface between pieces is only required) is not uniformly filled upon solidification when a low melting substance with a high vapor pressure, such as zinc, intervenes in the beam penetration. As the micro hole or groove is formed, sudden encounter of the substance results in immediate vaporization with an accompanying high vapor pressure to cause splatter or explosive disruption of the weld puddle (molten metal surrounding the focused spot). As shown in FIG. 3, large porosity, identified by the dark areas 10, is created by an absence of sufficient metal in the weld puddle to fill the bored opening or heat affected zone 13. Such porosity can become so severe as to leave little weld bond 14 at interface between the mated pieces, such as shown in FIG. 2.

As one phase or step toward solution of these problems, burn-through welds were made between coupons of rimmed steel and galvanized steel, the latter having the zinc coating removed from one face. The beam was directed incident on the galvanized piece (between 45° and 90° with respect to the plane of the workpiece). When the zinc-coated face was disposed away from the interface 11 and toward the beam, a non-porous weld was produced having the same characteristics as a weld between two pieces of rimmed steel. Accordingly, the zinc coating on the outwardly facing surface of the galvanized sheet had no deleterious effect on the weld. However, when the zinc coated face was disposed at the interface 11 to be welded (the bare side facing the beam) the characteristic porosity of burn-through welds between galvanized steel pieces appeared such as shown in FIG. 3. The degree of porosity formed indicated that the high vapor pressure of the trapped zinc destroyed the dynamic equilibrium of the melt puddle as the beam traversed a welding path 12 (into the plane of FIG. 3). The porosity was not influenced by welding speed (50 to 250 inches per minute) or spot sized (0.25 to 0.056 inches). Porosity resided in random arrangement along the heat affected zone such as illustrated in FIG. 4.

The next phase of the investigation comprised an attempt to combine zinc with another element and thereby reduce the vapor pressure by the mechanism of alloying. To this end, the galvanized coupons were coated with various metallic paints which included suspensions of silver, tin and copper. Each of these elements formed an alloy with the zinc and were expected to reduce the vapor pressure. Welds on galvanized steel with these paints appeared to reduce the porosity but when examined metallographically porosity was still present. The strength of these welds was erratic (only one sample did not fail in the weld). Copper paing decreased the porosity, but produced numerous cracks in the weld zone, probably as a result of the interaction of the copper and the steel. Accordingly, the attempt to alloy and promote a lower vapor pressure was unsuccessful.

Results on terne coated steel were essentially the same as for galvanized steel when using the alloying paints. Generally the tern appeared to be less susceptible to porosity to begin with and the paints decreased the porosity somewhat. The strength of the weld was, however, not as good as the uncoated rimmed steel weld.

It was ultimately discovered that certain substances, when used as a weld flux, will form a compound with the zinc which has a vapor pressure substantially the same and preferably lower than the steel substrate. In addition the melting point of the compound will be substantially the same or higher than the steel substrate.

The proposed solution is to locate a thin film of some chemical next to the trapped zinc with the property that as the material is heated by the energy beam, the film reacts with the zinc to form a compound with a boiling and melting point comparable to or higher than that of the steel. Iron oxide, copper oxide, and nickel oxide are examples of chemical compounds which, when heated in the vicinity of zinc, are reduced to form zinc oxide, a refractory compound with melting and boiling points comparable to steel.

When a film of iron oxide is placed between two sheets of galvanized steel and welded with a high power (5 kilowatts) carbon dioxide laser, the iron oxide is reduced to iron, and the zinc galvanizing is oxidized to zinc oxide. The high boiling point of zinc oxide results in a low vapor pressure from that compound. Lacking a driving force, weld splatter and proosity are substantially reduced. Welds of satisfactory quality result.

Other metal substances can be employed as long as they form the compound fast enough during welding and the resulting free metal must not be deleterious to the substrate.

Iron oxide is particularly reduced by zinc vapor to produce zinc oxide and free iron at the temperatures experienced in high energy density beam. It was deduced that if the reaction occurred rapidly enough, the vapor pressure would be significantly lowered. Both iron and copper oxide appear to react in the anticipated manner; however, iron oxide produced joints which were strong while the copper oxide produced brittle joints. Copper is soluble in iron and is known to cause hot shortness and cracking and therefore is somewhat deleterious in an iron matrix. Additionally, nickel oxide was utilized and found to be an effective flux material for eliminating the characteristic porosity. While some of the samples welded with an iron oxide flux were not totally free of porosity, all of the samples failed near the ultimate strength of the base metal and one half of them failed in the base metal.

In some detail, a preferred method sequence for making non-porous welds comprises: (a) mating two pieces of steel along a weld zone, at least one of which is coated with zinc at the weld zone interface, (b) placing a quantity of iron oxide, such as by painting, along the weld zone, and (c) subjecting the weld zone to a high energy density beam to create a burnthrough weld at the weld zone interface. The equipment used to generate the high energy density beam was a $CO_2$ electric disconvection laser. The power density at the point of focus should be at least $4 \times 10^6$ watts per square inch. The laser power was variable to a maximum of about 5 kilowatts. A 1.7 inches diameter beam was focused to approximately 0.025 inch diameter spot with a 10 inches focal length, 18° off axis, by use of a parabolic mirror. The power density at the focus was approximately $10^7$ watts per square inch. The steel pieces to be welded varied in thickness between 0.035 to 0.075 inches.

Welding samples were prepared to test out different types of weld configurations, a bead weld, a burnthrough weld, a lap weld, a coach joint weld and an edge weld. The phenomenon of this invention was not affected by the weld configuration.

The impingement of the focused high powered laser beam on a metallic surface generated a visible plasma which tended to scatter the laser radiation and, therefore, limited the amount of useable energy. A jet of helium gas was directed, through a tube, at a location closely adjacent to the spot focus of the laser beam. The jet was directed perpendicular to the path of the beam. This inert gas dissipated the plasma and prevented ionization of the metallic vapors. Helium was the most effective gas, however, shrouding gases such as $N_2$ and Arcon can be used.

It was discovered that the depth of penetration as well as the width of the fusion zone are influenced by the beam spot size at a constant power level. With advance rates of 200 inches per minute and at a power level of 4.4 kilowatts, complete penetration of the fusion zone is obtained through the entire thickness of a 0.035 inch sample for a bead weld. With a power level of 5 kilowatts and for a burn-through weld, the width of the fusion zone was found to be narrow at about 0.025 inches although complete penetration was achieved. It was also found that a gap of no greater than 0.01 inch can be tolerated between the pieces of the workpiece to be welded with a burn-through configuration; also a variation of the position of the beam focus relative to the surface of the workpiece of no greater than 0.2 inches can be tolerated to obtain effective welds.

I claim as my invention:

1. A method of joining base steel articles, at least one of which is coated with a substance having a vapor pressure higher than the base steel article, comprising:
   a. mating said articles along at least one zone thereof,
   b. locating a flux material at least along one portion of said zone, said material being constituted so as to form a compound with said substance upon high energy heating and said compound having a vapor pressure substantially the same or less than said base steel article, and
   c. heating said articles and flux material at least at said zone portion by high energy to provide a weld joint between said articles.

2. In a method of joining base steel articles, at least one of which is coated with a substance having a vapor pressure higher than the base steel articles, the steps comprising:
   a. mating said articles along at least one zone thereof,
   b. locating a deposit of flux material along at least one portion of said zone, said flux material being effective to form a compound with said substance having a boiling and melting temperature substantially the same or higher than the steel of said base article and a vapor pressure substantially the same or less than said base steel article, and
   c. subjecting at least said one portion of said zone to a high energy density beam effective to melt said base steel substance and flux material whereby said compound is formed and whereby splatterfree welding together of said articles is obtained.

3. A method as in claim 2, in which said high energy density beam is characterized by a power density at the point of focus on said base steel article which is greater than $4 \times 10^6$ watts per square inch.

4. A method as in claim 2, in which the focus of said high energy beam is shrouded by a helium jet for dispersing the plasma eminating from the surface of said steel based article.

5. A method as in claim 2, in which the power of said high energy beam is about 5 kilowatts and said beam is focused to affect a spot at said zone which is substantially 0.025 inches in diameter.

6. A method as in claim 1, in which the coating substance is zinc.

7. A method as in claim 1, in which the flux material is selected from the group consisting of iron oxide, copper oxide, nickel oxide.

8. A method as in claim 1, in which said flux material is deposited by painting a film on one of said steel based articles prior to said mating.

9. A method as in claim 2, in which the coating substance is zinc.

10. A method as in claim 2, in which the flux material is selected from the group consisting of iron oxide, copper oxide, nickel oxide.

11. A method as in claim 2, in which said flux material is deposited by painting a film on one of said steel based articles prior to said mating.

12. A method as in claim 2, in which the high energy density beam is a resultant of a high power $CO_2$ laser.

13. A method as in claim 2, in which the angle of incidence between said high energy density beam and said plane of impingement on said steel based article is variable between 45° and 90°.

14. A method as in claim 5, in which there is provided a space between said mated steel articles no greater than 0.01 inch and the variation of said beam focus relative to the surface of the workpiece during said welding is no greater than 0.2 inches.

15. The resultant product of the method of claim 2 wherein said substance is present during heating at least at said zone portion and in which the welded assembly is characterized by an absence of voids or porosity.

* * * * *